United States Patent [19]
Brooks et al.

[11] Patent Number: 5,283,284
[45] Date of Patent: Feb. 1, 1994

[54] POLYPROPYLENE-POLYPHTHALAMIDE BLENDS

[75] Inventors: Gary T. Brooks, Naperville; Brian L. Joss, River Forest; Charles L. Myers, Palatine, all of Ill.

[73] Assignee: Amoco Corporation, Chicago, Ill.

[21] Appl. No.: 889,813

[22] Filed: May 29, 1992

[51] Int. Cl.$^5$ .................. C08L 77/10; C08L 23/12
[52] U.S. Cl. .................... 525/179; 525/178; 525/184; 525/60
[58] Field of Search .............. 525/66, 183, 184, 179

[56] References Cited

U.S. PATENT DOCUMENTS

| | | | |
|---|---|---|---|
| 4,383,084 | 5/1983 | Paschket et al. | 525/184 |
| 4,404,312 | 9/1983 | Kokubu | 524/504 |
| 4,613,647 | 9/1986 | Yonaiyama et al. | 524/514 |
| 4,673,728 | 6/1987 | Nielinger | 528/339 |
| 4,831,108 | 5/1989 | Richardson | 528/335 |
| 4,988,764 | 1/1991 | Nishio et al. | 525/66 |
| 4,990,550 | 2/1991 | Iwanami et al. | 523/214 |
| 5,006,601 | 4/1991 | Lutz | 525/66 |

FOREIGN PATENT DOCUMENTS

| | | |
|---|---|---|
| 072270 | 12/1981 | Japan. |
| 1076540 | 4/1986 | Japan. |
| 000160 | 7/1987 | Japan. |
| 001502 | 9/1991 | Japan. |

OTHER PUBLICATIONS

Encyclopedia of Polymer Science and Eng. J. Wiley & Sons, New York, 1988, vol. 11, pp. 348-349, 372-373.
Solvay Technical Bulletin "Polyacrylamide and Grafted Polypropylene Alloys Properties and Applications"; English language translation from original French Documents. This bulletin is believed to have been published or presented in Spring of 1990, in Paris.

*Primary Examiner*—James J. Seidleck
*Assistant Examiner*—I. Zemel
*Attorney, Agent, or Firm*—Richard J. Schlott; Stephen L. Hensley

[57] ABSTRACT

Polypropylene resins are improved in mechanical properties and in rigidity without loss in thermal processability when blended with polyphthalamide resins together with a minor amount of a carboxylated polyolefin compatibilizing aid. Filled compositions, including glass-filled polypropylenes are similarly benefited when blended with a polyphthalamide and a carboxylated polyolefin compatibilizing aid.

10 Claims, No Drawings

POLYPROPYLENE-POLYPHTHALAMIDE BLENDS

BACKGROUND OF THE INVENTION

This invention relates to polypropylene resins, more particularly to improved compositions comprising a crystalline polypropylene and still more particularly to blends comprising polypropylene and polyphthalamide having improved tensile properties and rigidity, and to methods for improving the rigidity of crystalline polypropylene resins. The improved blends have excellent thermal processability, and provide thermally processable filled compositions and composites.

The highly desirable balance of mechanical and thermal property characteristics of crystalline polypropylene has gained these resins wide acceptance in the molding and extrusion art. The resins are found in a great variety of applications, and may be particularly attractive for use where resistance to chemical and environmental attack is required. However, unmodified polypropylenes are generally low in impact. Further, though the flexibility of these resins makes them highly desirable for many uses, for application where a greater rigidity is desired reinforcement, for example with glass fiber or the like, may be necessary to provide the needed increase in rigidity.

considerable effort has been made by the resin arts over the years to develop methods for improving the mechanical properties of crystalline polypropylene. A great variety of modifiers and additives that may be found useful for overcoming one or more deficiencies has resulted from these efforts, though improvement in a single resin property is quite often accomplished only at some sacrifice in the overall balance of properties. For example, although addition of a variety of copolyolefin rubbers or polyethylene resins to polyolefins may usefully increase impact resistance, in most instances such additives also effect a lowering of rigidity and heat resistance. Similarly, polyamides have been added to polyolefins to improve oil resistance and tensile properties, but the incompatibility of unmodified polyamides and polyolefins may cause the resulting blends to be generally poor in important mechanical properties, and may even cause partial or complete loss of integrity for articles molded or extruded from such blends. The incompatibility of polyolefins with polyamides has been overcome in the art by modifying the polyolefin component to obtain a stable dispersion of the polyamide in the polypropylene. See U.S. Pat. No. 4,988,764.

Polypropylene resins may also be modified with fiber, and glass fiber-reinforced polypropylene resins are particularly well known and widely sold for uses requiring increased rigidity and improved dimensional stability, particularly at elevated temperatures. The addition of glass fiber to polypropylene generally provides little improvement in other mechanical properties, largely because of poor adhesion to the glass fiber surface. Modification of the polypropylene with unsaturated carboxylic acid compounds and treatment of the fiber with coupling agents to provide a chemical interaction between the modified polypropylene and the fiber surfaces are among the methods that have been employed for overcoming these deficiencies, though with varying degrees of success. Such modifications frequently reduce the attractiveness and visual appearance of the surfaces of molded articles, making further efforts necessary to overcome these added problems. For example, in U.S. Pat. No. 4,613,647 there is described a method for improving the compatibility of glass reinforced, carboxyl-modified polypropylene by the addition of polyamides such as nylon 6 or nylon 66. However, the improved compositions are said to suffer because of an inherent reactivity of the polyamide with the carboxyl-modified polypropylene, resulting in yellowing and delustering in molded products. The patent further discloses overcoming these added problems through the use of meta-xylylene adipamides as the polyamide component of such compositions; even with these modifications, the resulting glass-reinforced blends remain somewhat deficient in rigidity and tensile properties.

Improved polypropylene resin formulations, both filled and neat, that are improved over polypropylene in rigidity and thermal characteristics without substantially reducing thermal processability, particularly moldability, are continually sought by the art for use in the production of molded and extruded articles. Such compositions could find wide acceptance in the plastic art, and such compositions would be particularly attractive for use in demanding environments where elevated temperatures and corrosive conditions may be encountered.

SUMMARY OF THE INVENTION

The present invention is directed to an improved composition or resin formulation comprising a crystalline polypropylene and a polyphthalamide, together with a compatibilizing quantity of a carboxylated polypropylene. The compositions have excellent mechanical properties and good surface appearance and are surprisingly thermally processable. The resin formulations, both neat and filled, are useful in producing molded and extruded articles, and fiber, film, laminates and composites comprising the formulations may be particularly desirable for use in demanding environments.

DETAILED DESCRIPTION

The improved compositions of this invention are blends comprising a crystalline polypropylene, a polyphthalamide, and a carboxylated polypropylene, and may optionally comprise a reinforcing fiber.

The polyphthalamides useful in the practice of this invention are copolyamides, and will comprise terephthalamides of aliphatic diamines and at least one additional diamide of an aliphatic diamine as the units forming the copolyamide. The aliphatic diamine component of the units forming the copolyamide may be one or more acyclic or cycloaliphatic $C_2$-$C_{12}$ aliphatic diamines such as hexamethylene diamine or the like, including such diamines having one or more $C_1$-$C_4$ alkyl substituents attached to the hydrocarbon portion thereof. The diamide component forming the units of additional diamide will be selected from aromatic diamides such as an isophthalamide, a naphthalene dicarboxylic acid diamide or the like, and $C_4$-$C_{12}$ acyclic or cycloaliphatic carboxylic diamides such as adipamide, sebacamide, cyclohexane dicarboxylic acid diamide or the like. Although the molecular weight of the polyphthalamides is not particularly important, generally molding or extrusion grade resins will be best suited for the purposes of this invention. Such resins are further described as inherent viscosities greater than about 0.4, preferably greater than about 0.6, and more preferably greater than about 0.8 when measured at 30° C. in a 60/40 phenol/tetrachloroethylene (TCE) mixture at a concentration of 0.4 g/dl. Although there is no particular upper limit for molecular weight to be suitable for use in these compositions, very high molecular weight polyphthalamides, those with an inherent viscosity as great as 2.0 or even greater, may be extremely difficult to process thermally and hence will not be preferred.

Although both amorphous and crystalline polyphthalamides are useful in the practice of the inventions, the polyphthalamides described in the art as crystalline or crystallizable will impart a higher degree of rigidity to the blends, and thus will be preferred for most applications. Those polyphthalamides found particularly useful in the practice of the invention comprise hexamethylene terephthalamide units and more preferably will comprise hexamethylene terephthalamide units and hexamethylene adipamide units, optionally including hexamethylene isophthalamide units. The crystalline or crystallizable copolyphthalamides will generally comprise at least 50 mole %, more preferably from about 60 mole % to about 80 mole % hexamethylene terephthalamide units the balance, from about 20 to about 50 mole %, more preferably from about 20 to about 40 mole %, being hexamethylene adipamide units or a mixture thereof with hexamethylene isophthalamide units, with the proviso that the polyphthalamide will comprise not more than 30 mole % isophthalamide units. That is, the preferred polyphthalamides will comprise from about 50 to about 80 mole % hexamethylene terephthalamide units, from about 50 to about 20 mole % hexamethylene adipamide units, and from about 0 to about 30 mole % hexamethylene isophthalamide units. Most preferred are terpolymers comprising greater than about 60 mole % hexamethylene terephthalamide units, from about 40 to about 15 mole % hexamethylene adipamide units, and from about 0 to about 25 mole % hexamethylene isophthalamide units.

Although less preferred, copolyphthalamides comprising less than about 50 mole % and more particularly to as little as about 35 mole % hexamethylene terephthalamide units will also be found to impart improved strength properties and rigidity to polypropylenes. Although such copolyphthalamides, as well as those that comprise greater than 30 mole % up to about 65 mole % isophthalamide units, may be amorphous and exhibit reduced thermal characteristics, when combined with polypropylene according to this invention the resulting blends exhibit attractive strength and rigidity characteristics, together with lower HDT values that may make the blends attractive for many uses where upper use temperatures are less important. Particularly attractive for such uses in blends with polypropylene are the copolyphthalamides comprising from about 40 to about 90 mole % hexamethylene terephthalamide units and, correspondingly, from about 60 to about 10 mole % hexamethylene isophthalamide units, alone or in combination with other units such as hexamethylene adipamide, dodecylene isophthalamide units or the like.

The polyphthalamides that are preferred for use in the practice of the invention may thus be generally described as copolyphthalamides, and more particularly as copolyphthalamides comprising greater than about 35 mole % hexamethylene terephthalamide units. Still more particularly the copolyphthalamides will comprise from about 35 to about 80 mole % hexamethylene terephthalamide units. More preferred are the copolyphthalamides comprising from about 35 to about 80 mole % hexamethylene terephthalamide units and from about 65 to about 20 mole % of at least one additional diamide of an aliphatic diamine, such as units selected from hexamethylene adipamide units, hexamethylene isophthalamide units and the like. Still more preferred are the crystalline or crystallizable copolyphthalamides which generally comprise at least 50 mole %, more preferably from about 60 mole % to about 80 mole % hexamethylene terephthalamide units and from about 20 to about 50 mole %, more preferably from about 20 to about 40 mole %, hexamethylene adipamide units or a mixture thereof with hexamethylene isophthalamide units, with the proviso that the polyphthalamide will comprise not more than 30 mole % isophthalamide units. That is, the more preferred polyphthalamides will comprise from about 50 to about 80 mole % hexamethylene terephthalamide units, from about 50 to about 20 mole % hexamethylene adipamide units, and from about 0 to about 30 mole % hexamethylene isophthalamide units. Most preferred are terpolymers comprising greater than about 60 mole % hexamethylene terephthalamide units, from about 40 to about 15 mole % hexamethylene adipamide units, and from about 0 to about 25 mole % hexamethylene isophthalamide units.

Such polyphthalamides are well known in the art, and a variety of copolyphthalamides including those described herein as preferred are available from commercial sources. The polyphthalamide resins and methods for their preparation are also fully described in the art, for example, in U.S. Pat. Nos. 4,603,166 and 4,831,108 the teachings of which are hereby incorporated herein.

The polypropylenes useful in the practice of this invention include both propylene homopolymers and copolymers of propylene comprising one or more copolymerizable alpha olefins such as ethylene, butene-1, pentene-1 and the like. Methods for the production of such polymers are widely known in the art, and suitable polypropylenes are readily available commercially for use as molding and extrusion resins. The preferred polypropylenes are molding and extrusion grade resins having weight average molecular weights typically greater than about 100,000, and are those identified in the art as substantially crystalline homopolymers.

The blends according to this invention may comprise polypropylene and polyphthalamide in weight ratios of from about 20/1 to 1/20; described more conveniently in terms of the polypropylene component, the invented blends may comprise 100 parts by weight (pbw) polypropylene and up to about 2000 parts by weight polyphthalamide. Preferably, the blends will comprise from about 5 to about 200 pbw polyphthalamide, and still more preferably from about 5 to about 100 pbw polyphthalamide, per 100 pbw polypropylene.

Blends of polypropylene with highly polar resins such as polyamides are not generally compatible and the art has developed a variety of compatibilizing additives to overcome this deficiency. Among the variety of compatibilizing additives known for such use are carboxyl-modified polyolefins obtained, for example, by grafting polypropylene with a suitable carboxylic compound such as a carboxylic acid, for example acrylic or methacrylic acid, a carboxylic acid anhydride such as maleic acid, an acid amide such as acrylamide or the like in the presence of a peroxide compound. A variety of processes have been developed for the preparation of such additives including, for example, the melt-mixing a mixture of polypropylene and the reactants in a compounding extruder. A variety of such processes have been described in the art, for example in U.S. Pat. No. 5,001,197 and the references discussed therein. The additives may comprise as little as 0.01 wt % carboxyl functionality, more preferably from about 0.1 to as great as 5 wt % or greater carboxyl functionality. The molecular weight of the polymeric additive, which will depend in part on the molecular weight of the polyolefin used in its preparation, is not particularly critical; according to published information the additives preferred for use with polyamides are those having a melt index in the range of about 0.5 to about 200 g/10 min. Suitable additives are well known and widely available to the trade from commercial sources, including the maleated polypropylenes supplied as Hercoprime G from Himont Corporation and the Exxelor PO series of additives from Exxon Chemical Company, as well as the acrylic acid-grafted polypropylenes and maleated polypropylenes sold under the Polybond label by BP Polymers, Inc. The amount of carboxyl-modified polyolefin additive employed will be a quantity sufficient to compatibilize the polypropylene and polyphthalamide components. Generally, from about 2 to about 20 parts by weight (pbw) carboxyl-modified polyolefin additive, preferably carboxyl-modified polypropylene additive, per 100 parts combined weight of polypropylene and polyphthalamide will suffice to overcome the incompatibility of the blend components and provide the improved compositions of this invention.

Although the improved polypropylene compositions of the invention are improved in mechanical properties, and particularly in rigidity as reflected in flexural modulus, for compositions comprising low levels of polyphthalamide, i.e. up to about equal quantities of polypropylene and polyphthalamide, the value for heat distortion temperature under load (HDT) will be observed to be only moderately increased, and the good thermal processability characteristics of polypropylene are retained. Aromatic polyamides are high melt-temperature thermoplastics and, particularly when filled, require temperatures and pressures considerably greater than are ordinarily necessary for successful thermal processing of polypropylene. The increase in rigidity of the blend without substantial reduction in thermal processability as characterized by HDT is therefore surprising.

The polypropylene-polyphthalamide blends of this invention may be further combined with a structural fiber to provide fiber-reinforced composites having a balance of mechanical properties substantially improved over fiber-reinforced polypropylene, particularly in flexural modulus and flexural strength. The improvement in flexural rigidity and strength without a substantial reduction in the thermal processability noted for the neat resin formulations comprising from about 5 to about 100 pbw polyphthalamide per hundred pbw polypropylene is also observed for the corresponding fiber-reinforced blends. Generally, increases in flexural rigidity of a resin by addition of a filler or fiber reinforcement are achieved only at the cost of a reduction in thermal processability. The processability of the fiber-reinforced polypropylene compositions of this invention is surprising and unexpected, and may be of particular importance to the commercial utility of these blends.

Blends according to this invention comprising high levels of polyphthalamide, greater than about 200 pbw polyphthalamide per hundred pbw polypropylene, preferably from about 300 pbw polyphthalamide to as great as 2000 pbw polyphthalamide per hundred pbw polypropylene, exhibit substantial further increases in mechanical properties including rigidity. However, a high proportion of the high melting polyphthalamide component in such blends, particularly when fiber reinforced, substantially increases melt viscosity. Such blends will therefore be less preferred for use over filled polypropylene in applications where processability and cost are important factors.

Fiber-reinforced formulations comprising the polypropylene-polyphthalamide blends of this invention may be useful in providing composite products, and will comprise from about 10 to about 80 wt % structural fiber such as, for example, glass fiber, carbon or graphite fibers and fibers formed of silicon carbide, alumina, titania, boron and the like, as well as fibers formed from high temperature engineering resins such as, for example, poly(benzothiazole), poly(benzimidazole), polyarylates, poly(benzoxazole), aromatic polyamides, polyaryl ethers and the like, and may include mixtures comprising two or more such fibers. Preferably the fibers will be selected from glass fibers, carbon fibers and aromatic polyamide fibers such as the fibers sold by the DuPont Company under the trade name Kevlar. The resin blend may be filled with structural fiber in the form of chopped or short fibers, flock, fiber pulp, fibrils and the like to provide molding compositions. Alternatively, the resin blend may be reinforced with fiber in the form of continuous tows of typically from 500 to 420,000 filaments, as continuous unidirectional tape or as woven cloth, for providing laminates and structural composites. For most applications, and particularly for use in filled molding resins, the preferred fiber will be glass fiber, more preferably chopped glass fiber, and will be from about 2 to 50 microns, preferably from about 2 to about 20 microns, and more preferably less than about 10 microns in diameter and generally will be less than about ½ inch in length. Where the intended use is as a fiber-filled molding resin, the composition will preferably comprise from about 10 to about 50 wt % structural fiber, and more preferably from about 20 to about 45 wt % structural fiber, preferably glass fiber.

The polypropylene-polyphthalamide blends of this invention may also be combined with pigments, dyes, fillers and the like as is commonly practiced in the resin arts, and these further additives may be used in any combination as needed, including with structural fiber. Among the fillers which may be found useful in forming filled polyphthalamides according to the invention are the commonly employed flake, spherical and fibrous particulate fillers reinforcements and nucleating agents such as talc, mica, titanium dioxide, potassium titanate, silica, kaolin, chalk, alumina, mineral fillers and the like. For particular applications, it may also be useful to include plasticizers, lubricants and mold release agents, as well as thermal, oxidative and light stabilizers and the like, and the addition of impact modifiers may also be desirable. The levels of such additives will be determined for the particular use envisioned, with up to about 50 wt %, based on total composition, of such additional additives considered to be within the range of ordinary practice in the molding and extrusion arts.

The invention will be better understood by consideration of the following Examples, which are provided by way of illustration of the invention and are not intended to be limiting thereof. In the Examples, all parts are by weight, and all temperatures are given in Centigrade unless otherwise noted.

EXAMPLES

The following materials and formulations are employed in the Examples.

Polypropylene I: Crystalline polypropylene obtained from Amoco Chemical Company as Amoco 5013. The polymer has an ASTM D1238 MFR value of 3.7 g/10 min and an IV of 2.05 (decalin, 135° C.), and contains stabilizers.

Polypropylene II: Polypropylene obtained from Amoco Chemical Company as Amoco Enhanced Polypropylene Grade 9433X. The polymer is a nucleated polypropylene with an ASTM D1238 MFR value of 12 g/10 min and a density of 0.91 g/cc, and contains stabilizers.

Polypropylene III: Polypropylene obtained from Amoco Chemical Company as Amoco Enhanced Polypropylene Grade 9119X. The polymer is nonnucleated polypropylene with an ASTM D1238 MFR value of 2 g/10 min and a density of 0.91 g/cc, and contains stabilizers.

Polyphthalamide I: Hexamethylene terephthalamide-adipamide-isophthalamide terpolymer, mole ratio 65/10/25, inherent viscosity of 0.94 dl/g determined at 30° C. in a 60/40 phenol/TCE mixture at a concentration of 0.4 g/di. Obtained as Amodel® polyphthalamide from Amoco Chemical Company.

Carboxylated Polypropylenes

CarboxyPP A: Carboxylated polypropylene having 3.5 wt % carboxyl functionality, obtained as Hercoprime G from Himont Corporation.

CarboxyPP B: Maleated propylene polymer having 0.4 wt % carboxyl functionality (published value), obtained as Exxelor PO 1015 from Exxon Chemical Company.

CarboxyPP C: Anhydride-grafted polypropylene having 0.1–0.2 wt % carboxyl functionality, obtained as Exxelor PO 2011 from Exxon Chemical Company.

Glass Fiber S: Chopped glass fiber, nominal dimensions 9.0 micron diameter and 0.1–0.2 in. length, obtained from Owens-Corning Company as OCF-492.

Glass Fiber L: Chopped glass fiber, nominal dimensions 13.0 micron diameter and 0.1–0.2 in. length, obtained from Owens-Corning Company as OCF-457.

Test Procedures

Mechanical Properties. The mechanical properties are room temperature properties, determined according to ASTM published procedures D-638 (tensile properties), D-790-58T (flexural properties) and D-256-56 (notched Izod impact) unless otherwise noted; the heat deflection properties were determined on unannealed samples by ASTM D-648.

UV Stability. Slit film tapes were exposed to accelerated weathering in a Carbon-arc Weather-Ometer, produced by Atlas Electric Devices, Inc., using 50% relative humidity and a chamber temperature of 68° C. (black panel). Tensile properties were determined for the tape specimens at 149,200, 250 and 300 hours. Data are reported as % retained tenacity.

Thermal Stability. Slit film tapes were placed in a circulating air oven at 125° C. and subjected to a ten gram tensile load. Data are reported as days to failure (breaking) of the tape.

The methods of the following Examples are representative of those that may be employed for preparing the resin formulations and glass fiber-filled molded articles according to the practice of this invention. The processes will be generally recognized by those skilled in the art as processes and methods commonly employed for the production of fiber-filled resin formulations and molded articles and composites. The specimens of commercial resins used as controls were prepared and tested using substantially the same processes and conditions employed for the examples according to the invention; the test results may vary from published data for commercial materials processed in different equipment under other processing conditions.

EXAMPLES 1–4

Polymer blends comprising polypropylene and polyphthalamide were prepared by extrusion compounding polypropylene, polyphthalamide and carboxylated polypropylene. The dried polymer components were first mixed in a 32,051 tumble mixer, together with stabilizers when employed, then fed to the first feed port of a ZSK-30 Werner Pfleiderer extruder using a nitrogen-purged hopper feeder at a rate of approximately 14 lb/hr. The melt temperatures during the extrusion ranged generally from 285° to about 320° C., depending in part on the ratio of polyphthalamide to polypropylene. The extrudate, after cooling in a water bath, was chopped and then vacuum dried before being injection molded using an Arburg 221E/150 molding machine to form the injection molded test specimens. Control Examples A–D, omitting one or more components, were prepared, molded and tested by the same procedures. The formulation for Example 2 was compounded using a ⅜ inch, single-screw Brabender extruder. The compositions and properties are summarized in Table I.

TABLE I

| Polypropylene-Polyphthalamide-Carboxylated Polypropylene Neat Resin Blends | | | | | | | | |
|---|---|---|---|---|---|---|---|---|
| Example.: | Control A | 1 | 2 | 3 | 4 | Control B | Control C | Control D |
| Blend Components[1] | | | | | | | | |
| Polypropylene I parts | 100 | 100 | 100 | 100 | 100 | 100 | 100 | 100 |
| Polyphthalamide I parts | 0 | 18 | 71 | 318 | 727 | 11 | 100 | 900 |
| CarboxyPP A parts | 0 | 4.2 | 7.1 | 36.4 | 81.8 | 0 | 0 | 0 |
| (%) | | (3) | (4) | (8) | (9) | | | |
| Mechanical Properties[2] | | | | | | | | |
| Ult. tensile Str. psi | 3,000 | 5,300 | 5,800 | 11,000 | 11,300 | 3,900 | 6,900 | 11,300 |
| Elong./break % | 140 | 12 | 6.1 | 7.0 | 12.6 | 29.5 | 4.3 | 4.5 |

TABLE I-continued

Polypropylene-Polyphthalamide-Carboxylated Polypropylene Neat Resin Blends

| Example.: | Control A | 1 | 2 | 3 | 4 | Control B | Control C | Control D |
|---|---|---|---|---|---|---|---|---|
| Flex. Mod. Kpsi | 210 | 271 | 322 | 380 | 400 | 180 | — | — |
| HDT, 264 psi °F. | 142 | 188 | 193 | 235 | 245 | 180 | 218 | 235 |

Notes:
[1] For blend preparation, identity of components, see Specification, Examples. Quantities are in parts by weight.
[2] Room temperature properties, see text. Ult. Tensile Str. = ultimate tensile strength; Elong/break = tensile elongation at break; Flex Mod = flexural modulus, HDT = heat deflection temperature for 10 mil deflection under 264 psi load.

It will be seen that addition of a polyphthalamide to polypropylene, together with a compatibilizing quantity of a carboxylated polypropylene, substantially improves tensile and flexural properties without substantially affecting thermal characteristics of as reflected by HDT, particularly for polyphthalamide to polypropylene ratios below about 1:1. Compare Examples 1 and 2 with Controls A and B. Even though more rigid, the resulting resin blends were found to remain readily melt-processable such as by injection molding and extrusion.

EXAMPLE 5

An additional neat resin blend was prepared from 100 pbw Polypropylene I, 1980 pbw Polyphthalamide I and 4.2 pbw CarboxyPP A carboxylated polypropylene. The 264 psi HDT for the blend, prepared, molded and tested substantially following Examples 1–4, was 240° F.

From a consideration of the properties of the blends of Examples 3–5, it will be apparent that further increases in the level of polyphthalamide, to ratios of polyphthalamide and polypropylene substantially above about 1:1, further improve strength properties and are substantially more rigid in character. Thus, for polyphthalamide to polypropylene ratios significantly greater than 1:1, i.e. at ratios of about 3:1, as in Example 3 and higher (Example 4 > 7:1) to as great as 20:1 (Example 5), the blends are substantially higher in HDT, thus having a higher service temperature. However, the blends will require higher temperatures in processing and forming operations, and higher mold temperatures.

EXAMPLES 6–8

Additional polymer blends with polyphthalamide to polypropylene ratios near 1:1 were prepared by extrusion compounding polypropylene, polyamide and carboxylated polypropylene. Control examples omitting one or more components were prepared, molded and tested by the same procedures. The compositions and properties are summarized in Table II.

TABLE II

Polypropylene-Polyphthalamide-Carboxylated Polypropylene Neat Resin Blends

| Example.: | 6 | 7 | 8 | Control C | Control E |
|---|---|---|---|---|---|
| Blend Components[1] | | | | | |
| Polypropylene I parts | 100 | 100 | 100 | 100 | 0 |
| Polyphthalamide I parts | 104 | 111 | 125 | 100 | 100 |
| CarboxyPP C parts | 4.2 | 11 | 25 | 0 | 0 |
| (%) | (2) | (5) | (10) | | |
| Mechanical Properties[2] | | | | | |
| Ult. tensile Str. psi | 8,300 | 7,100 | 5,100 | 6,900 | 13,200 |
| Elong./break % | 7.2 | 10.2 | 6.2 | 4.3 | 4.6 |
| HDT, 264 psi °F. | 233 | 225 | 193 | 218 | 240 |

Notes:
See notes to Table I.

It will be seen from the blends of Examples 6–8 that the HDT values of blends comprising about equal quantities of polyphthalamide and polypropylene may be lowered by increasing the level of carboxylated polypropylene. However, it will also be apparent that the strength properties of the neat resin blends may be detrimentally affected, and such compositions thus will be less preferred.

EXAMPLES 9–15

Blends comprising polypropylene, a fixed level of carboxylated polypropylene and varying levels of polyphthalamide were prepared and tested substantially by the procedures of Examples 1–4. The compositions and the HDT values for the blends and for Control Examples F and G comprising the resin components processed and molded under the same conditions are summarized in Table III.

TABLE III

HDT Values For Polypropylene-Polyphthalamide-Carboxylated Polypropylene Neat Resin Blends

| Example No.: | Control F | 9 | 10 | 11 | 12 | 13 | 14 | 15 | Control G |
|---|---|---|---|---|---|---|---|---|---|
| Polypropylene I parts | 100 | 100 | 100 | 100 | 100 | 100 | 100 | 100 | 0 |
| Polyphthalamide I parts | 0 | 5.5 | 12 | 45 | 104 | 243 | 938 | 1980 | 100 |
| CarboxyPP A parts | 0 | 4 | 4 | 4 | 4 | 4 | 4 | 4 | 0 |
| HDT, 264 psi °F. | 135 | 136 | 142 | 171 | 202 | 231 | 237 | 240 | 241 |

Note:
See notes to Table I.

For blends according to this invention comprising low levels of the polyphthalamide component, generally at ratios of polyphthalamide to polypropylene below about 1:1 (Example 12), i.e. for compositions with less than about 100 pbw polyphthalamide per hundred parts polypropylene, the HDT and thereby thermal processability will be only moderately increased over the values for polypropylene resin. As was observed for the compositions of Examples 1–8, polypropylene compositions comprising up to about an equal quantity of polyphthalamide, and more particularly for composition ratios of polypropylene to polyphthalamide in the range of from about 9:1 to about 1:1, more preferably from about 6:1 to about 1:1, together with from about 2 to about 20 wt % carboxylated polypropylene based on total composition, exhibit a particularly desirable balance of mechanical properties and thermal properties, particularly including processability.

EXAMPLES 16–17

Blends of polypropylene, polyphthalamide and carboxylated polypropylene were prepared substantially following the procedures of Examples 1–4. The blends were extruded using a Davis-Standard extruder using a melt temperature of 299°–314° C. to provide film. The extruded film was quenched at 25°–35° C., slit into tapes and drawn at approximately 148° C. at a 6:1 ratio, then relaxed 3–10% at approximately 145° C. The slit tapes were wound on a bobbin and submitted for testing to provide data for tenacity, and for thermal stability at 125° C. and UV stability. Tape was prepared from polypropylene using substantially the same procedures for comparison purposes. The film compositions and properties are summarized in Table IV.

TABLE IV

UV Stability and Tenacity of Slit Tape from Polypropylene-Phthalamide Blends

| Example No.: | Control H | 16 | 17 |
|---|---|---|---|
| Polypropylene I parts | 100 | 100 | 100 |
| Polyphthalamide I parts | 0 | 18.5 | 71 |
| CarboxyPP A parts | 0 | 5 | 7 |
| Denier g/9000 m | 1044 | 1082 | 1185 |
| Tensile Strength grams | 5708 | 3707 | 4382 |
| Tenacity g/denier | 5.4 | 3.4 | 3.7 |
| Elongation % | 31 | 15 | 11 |
| UV stability, 200 hrs % retained tenacity | 57 | 64 | 75 |
| Thermal Stability, 125° C. Days to failure | 39 | 26 | 441 |

For compositions, test procedures, see notes to Table I and Examples.

The addition of moderate levels of polyphthalamide to polypropylene according to the invention, Examples 16 and 17, will be seen to provide improvement in UV stability. A surprising and substantial improvement in thermal-oxidative stability of polypropylene is also produced when blended with polyphthalamides according to the invention, as shown by Example 17.

Additional film specimens of Example 17 and of Control I, obtained after the chilling step and without drawing, were submitted for surface testing. The films were evaluated for static and kinetic coefficient of friction following the procedure of ASTM D-1894. Both the chill roll side and the opposing or "out" side of each film was evaluated. The compositions and frictional data are summarized in Table V.

TABLE V

Film Surface Friction Properties of Polypropylene-Phthalamide Blend

| Example No.: | Control H | 17 |
|---|---|---|
| Polypropylene I parts | 100 | 100 |
| Polyphthalamide I parts | 0 | 71 |
| CarboxyPP A parts | 0 | 7 |
| Coefficient of Friction Outside | | |
| static | 0.558 | 0.435 |
| kinetic | 0.535 | 0.360 |
| Roll contact side | | |
| static | 0.623 | 0.438 |
| kinetic | 0.585 | 0.381 |

For compositions, test procedures, see notes to Table I and Examples.

Films comprising blends of this invention will thus be seen to exhibit significant improvement in surface frictional properties approaching that of commercial slip films, i.e., a coefficient of friction value of approximately 0.30, even though no slip additives are included in the blend formulation.

EXAMPLES 18–19

Blends of polypropylene, polyphthalamide and carboxylated polypropylene were prepared substantially following the procedures of Examples 1–4 and melt-spun through a 29-hole die fitted to one inch single screw extruder, providing continuous filament yarn for physical testing. The yarn compositions and properties are summarized in Table VI.

TABLE VI

Polypropylene-Phthalamide Blend Fiber Properties

| Example No.: | Control H | 18 | 19 |
|---|---|---|---|
| Polypropylene I parts | 100 | 100 | 100 |
| Polyphthalamide I parts | 0 | 5.5 | 18.5 |
| CarboxyPP A parts | 0 | 4.4 | 5 |
| Denier g/9000 m | 180 | 192 | 200 |
| Tenacity g/denier | 2.0 | 1.3 | 1.1 |
| Elongation % | 406 | 424 | 438 |
| Modulus g/denier | 12 | 11 | 12 |

For compositions, test procedures, see notes to Table I and Examples.

The improvement in mechanical properties and particularly rigidity of polypropylene realized when adding polyphthalimide and a compatibilizing quantity of carboxylated polypropylene extends to filled compositions. The processes described herein and used to provide compositions of the invention filled with glass fiber following examples will be seen to be those processes and procedures commonly employed in the resin art for the production of glass-filled resin compositions.

EXAMPLES 20–26

Glass reinforced polymer blends were prepared by extrusion compounding polypropylene, polyphthalamide, glass fiber and carboxylated polypropylene. The dried polymer components were first mixed in a tumble mixer, together with stabilizers when employed, then fed to the first feed port of a ZSK-30 Werner Pfleiderer extruder using a nitrogen-purged hopper feeder at a rate of approximately 14 lb/hr. The glass fiber, also dried, was added to the melt downstream at the rate necessary to achieve the desired fiber loading, in most instances 7 lb/hr. The melt temperatures during the extrusion ranged generally from 285° to about 320° C., depending in part on the polyamide employed and the ratio of polyamide to polypropylene. The extrudate, after cooling in a water bath, was chopped and then vacuum dried before being injection molded using an Arburg 221E/150 molding machine to form test specimens. Control Examples I-K were similarly prepared and tested. The compositions and properties of the molded, fiber-filled articles are summarized in Table VII. The glass fiber levels are the nominal levels; actual values are ±3 wt %.

TABLE VII

| | Polypropylene-Polyphthalamide-carboxylated Polypropylene Glass Fiber-Filled Composites | | | | | | | | | |
|---|---|---|---|---|---|---|---|---|---|---|
| Example No.: | Control I | Control J | 20 | 21 | 22 | 23 | 24 | 25 | 26 | Control K |
| Blend Components[1] | | | | | | | | | | |
| Polypropylene I, parts | 100 | 100 | 100 | 100 | 100 | 100 | 100 | 100 | 100 | 0 |
| Polyphthalamide I, parts | 0 | 0 | 35.5 | 73 | 111 | 171 | 280 | 375 | 533 | 100 |
| CarboxyPP B, pphr | 0 | 5.3 | 4.2* | 5.3 | 5.3 | 5.3 | 5.3 | 5.3 | 5.3 | 0 |
| Glass Fiber S, wt % | 33 | 33 | 33 | 33 | 33 | 33 | 33 | 33 | 33 | 33 |
| Mechanical Properties[2] | | | | | | | | | | |
| Ult tensile Str, psi | 6,000 | 11,500 | 17,400 | 14,700 | 13,200 | 15,400 | 20,300 | 26,000 | 24,700 | 26,400 |
| Flex Strength, psi | 9,600 | 16,500 | 23,800 | 21,400 | 20,100 | 22,500 | 29,000 | 35,500 | 32,800 | 33,900 |
| Flex Mod, Kpsi | 852 | 945 | 970 | 1,170 | 1,100 | 1,080 | 1,480 | 1,280 | 1,330 | 1,430 |
| Izod Impact, ft lb/in-notch | 1.4 | 1.5 | 2.1 | 1.4 | 1.4 | 1.4 | 1.9 | 1.7 | 1.5 | — |
| HDT, 264 psi, °F. | 260 | 307 | 316 | 317 | 325 | 322 | 467 | 516 | 503 | 523 |

Notes:
[1] Resin amounts in parts by weight; CarboxyPP additives in parts by weight per hundred parts combined polypropylene and polyphthalamide resin components (pphr); glass fiber content is 33 ± 3 wt %, based on total weight of reinforced composite; *additive is Carboxy PP A; see Examples for further description.
[2] Ult. Tensile Str. = ultimate tensile strength; Flex Strength = flexural strength; Flex Mod = flexural modulus, Max. Strain = strain at flexural break; Izod Impact for ⅛ inch thick specimen, notched; HDT = heat deflection temperature for 10 mil deflection under 264 psi load.

It will be apparent that the addition of glass fiber to polypropylene-polyphthalamide blends according to the invention provides a substantial further improvement in mechanical properties, and particularly flexural properties. Adding carboxylated polypropylene alone to glass filled polypropylene increases strength properties, seen by comparing Control Examples I with Control Example J. As with the neat resin blends of Examples 1-8, filled blends comprising low levels of polyphthalamide and carboxylated polypropylene (Examples 20-23) are increased in mechanical properties, and particularly flexural strengths, while remaining substantially unchanged or little changed in high temperature characteristics as represented by HDT value.

Filled blends comprising high levels of polyphthalamide exhibit substantially higher HDT values (Examples 24-26). Even though the mechanical and flexural properties of such blends are sharply increased and may be desirable for many applications, as with the corresponding neat resin blends these filled compositions will be less preferred where thermal processability is a major consideration.

EXAMPLES 27 and 28

Two additional glass-filled blends of polypropylene and polyphthalamide were prepared substantially by the procedures of Examples 21-26 but using a different carboxylated polypropylene. The compositions and properties of these blends and the corresponding glass-filled control compositions are summarized in Table VIII.

TABLE VIII

| | Polypropylene-Polyphthalamide-carboxylated Polypropylene Composites. 33 Wt % Glass fiber-Filled | | | | |
|---|---|---|---|---|---|
| Example No.: | Control L | 27 | 28 | Control M | Control K |
| Blend Components[1] | | | | | |
| Polypropylene I parts | 100 | 100 | 100 | 100 | 0 |
| Polyphthalamide I parts | 0 | 35.2 | 357 | 0 | 100 |
| CarboxyPP A parts | 0 | 5.6 (4%) | 19 (4%) | 7.5 | 0 |
| Glass Fiber S wt % | 33 | 33 | 33 | 33 | 33 |
| Mechanical Properties[2] | | | | | |
| Ult. tensile Str. psi | 6,200 | 18,600 | 24,000 | 13,800 | 26,400 |
| Flex. Strength psi | 10,400 | 25,200 | 32,600 | 20,700 | 33,900 |
| Flex. Mod. Kpsi | 910 | 1,100 | 1,240 | 850 | 1,430 |
| Izod Impact ft lb/in-notch | 1.3 | 2.1 | 1.9 | — | — |
| HDT, 264 psi °F. | 259 | 316 | 493 | 308 | 523 |

Note:
See notes to Table VII.

It will again be apparent that the addition of a carboxylated polypropylene additive to glass-filled polypropylene significantly increases the strength properties (compare Control L and Control M). The further addition of a moderate amount of polyphthalamide (Example 27) significantly increases the rigidity of the molded blend with only a moderate increase in HDT value. However, although higher levels of polyphthalamide produce still further increases in strength and rigidity (Example 28), the HDT value for the blend is also substantially increased, while processability becomes more difficult and cost are increased.

EXAMPLES 29-31

The procedures of Example 20 were used to extrusion compound, mold and test glass-filled polymer blends from three commercial polypropylenes and Polyphthalamide I at two different levels of the polyphthalamide. The blends also comprised 11 parts by weight CarboxyPP B per hundred parts combined polypropylene and polyphthalamide and 33 wt % Glass Fiber S. Control Examples P-R omitting the polyphthalamide were also prepared, molded and tested for comparison purposes, using the same procedures. The compositions and properties are summarized in Table IX. The 33 wt % glass fiber levels are the nominal levels; actual values are ±3 wt %.

TABLE IX

Polypropylene-Polyphthalamide-carboxylated Polypropylene Blends. 33 Wt % Glass fiber-Filled

| Example No.: | Control N | 29 | Control O | 30 | Control P | 31 |
|---|---|---|---|---|---|---|
| Blend Components[1] | | | | | | |
| Polypropylene I, parts | 100 | 100 | — | — | — | — |
| Polypropylene II, parts | — | — | 100 | 100 | — | — |
| Polypropylene III, parts | — | — | — | — | 100 | 100 |
| Polyphthalamide I, parts | 0 | 38 | 0 | 38 | 0 | 38 |
| CarboxyPP B, pphr | 11 | 11 | 11 | 11 | 11 | 11 |
| Mechanical Properties[2] | | | | | | |
| Ult. tensile Str., psi | 14,700 | 16,000 | 10,500 | 17,400 | 9,100 | 19,400 |
| Flex. Strength, psi | 21,500 | 21,600 | 14,500 | 24,600 | 13,000 | 28,000 |
| Flex. Mod., Kpsi | 860 | 1,100 | 1,060 | 1,210 | 1,020 | 1,250 |
| Max. Strain, % | 3.6 | 2.4 | 2.1 | 2.7 | 1.8 | 2.9 |
| Izod Impact, ft lb/in-notch | 2.5 | 2.0 | — | 2.2 | — | 2.8 |
| HDT, 264 psi °F. | 307 | 308 | 299 | 311 | 297 | 314 |

Note:
CarboxyPP B in parts per hundred parts by weight combined polypropylene and polyphthalamide. Also see notes to Table III.

It will again be apparent that the addition of a moderate amount of polyphthalamide to polypropylene, generally less than about 100 parts per hundred parts polypropylene, together with a carboxylated polypropylene to compatibilize the blend provides significant improvement in strength and rigidity of the glass-filled resin blend.

EXAMPLES 32-34

A hexamethylene terephthalamide-isophthalamide (40/60 mole ratio) copolyamide was prepared substantially following the procedures of U.S. Pat. No. 4,831,108. The copolyamide was combined with polypropylene and carboxylated polypropylene to provide blends, then molded and tested substantially by the procedures of Examples 1-4. The properties and compositions are summarized in the following Table X.

TABLE X

Polypropylene-Polyphthalamide-Carboxylated Polypropylene Neat Resin Blends

| Example No.: | Control A | 32 | 33 | 34 | Control Q |
|---|---|---|---|---|---|
| Blend Components[1] | | | | | |
| Polypropylene I parts | 100 | 100 | 100 | 100 | 0 |
| Polyphthalamide - TA/IA (40/60) parts | 0 | 26 | 45 | 71 | 100 |
| CarboxyPP A parts | 0 | 5 | 6 | 6 | 0 |
| (%) | | (4) | (4) | (4) | |
| Mechanical Properties[2] | | | | | |
| Ult. tensile Str. psi | 3,000 | 4,800 | 5,400 | 5,600 | 12,600 |
| Elong./break % | 140 | 15 | 8.8 | 6.0 | — |
| Flex. Mod. Kpsi | 210 | 245 | 262 | 279 | 410 |
| HDT, 264 psi °F. | 142 | 155 | 158 | 166 | 226 |

Note:
See notes, Table I.

It will again be seen that neat resin blends comprising generally less than about 100 parts phthalamide per hundred parts polypropylene are significantly improved in strength properties and rigidity.

In the following Examples 35-40, blends of polypropylene with a variety of copolyphthalamides were prepared and tested as filled molded articles.

EXAMPLES 35

A hexamethylene terephthalamide-adipamide copolyamide (65/35 mole ratio) was prepared substantially following the procedures of U.S. Pat. No. 4,831,108. The polyamide had an inherent viscosity of 0.98. The copolyamide was combined with polypropylene and glass fiber to provide a blend comprising 20 pbw Polypropylene I, 75 pbw of the polyphthalamide and 5 pbw of CarboxyPP B filled with 45 wt % Glass Fiber S, and then injection molded to provide test specimens, substantially according to Example 10. Tested as before, the values obtained for the mechanical properties included HDT=549° F., ultimate tensile strength=27,200 psi and notched Izod impact=2.1 ft lb/in-notch.

EXAMPLE 36

Hexamethylene terephthalamide-adipamide-isophthalamide copolyamide having a 65/10/25 mole ratio and an inherent viscosity of 0.99, was prepared substantially following the procedures of U.S. Pat. No. 4,831,108. The polyphthalamide was combined with polypropylene and glass fiber to provide a blend comprising 20 pbw Polypropylene I, 75 pbw of the polyphthalamide and 5 pbw of CarboxyPP B filled with 30 wt % Glass Fiber S, and then injection molded to provide test specimens, substantially according to Example 10. Tested as before, the values obtained for the mechanical properties included HDT=537° F., ultimate tensile strength=28,100 psi, flexural strength=36,300 psi, flexural modulus=1,230 Kpsi and notched Izod impact=2.0 ft lb/in-notch.

EXAMPLE 37

Hexamethylene terephthalamide-adipamide-isophthalamide copolyamide having a 60/20/20 mole ratio and an inherent viscosity of 0.93, was prepared substantially following the procedures of U.S. Pat. No. 4,831,108. The polyphthalamide was combined with polypropylene and glass fiber to provide a blend comprising 20 pbw Polypropylene I, 75 pbw of the polyphthalamide and 5 pbw of CarboxyPP B filled with 28 wt % Glass Fiber S, and then injection molded to provide test specimens, substantially according to Example 10. Tested as before, the values obtained for the mechanical properties included HDT=511° F., ultimate tensile strength=25,400 psi, flexural strength=34,100 psi, flexural modulus=1,200 Kpsi and notched Izod impact=1.9 ft lb/in-notch.

EXAMPLE 38

A terephthalamide-isophthalamide (80/20 mole ratio) copolyamide was prepared from hexamethylene diamine and dodecyldiamine (80/20 mole ratio) substantially following the procedures of U.S. Pat. No. 4,831,108. The polyamide had an inherent viscosity of 0.99. The copolyamide was combined with polypropylene and glass fiber to provide a blend comprising 20 pbw Polypropylene I, 75 pbw of the polyphthalamide and 5 pbw of CarboxyPP B filled with 29 wt % Glass Fiber S, and then injection molded to provide test specimens, substantially according to Example 10. Tested as before, the values obtained for the mechanical properties included HDT=520° F., ultimate tensile strength=24,000 psi, flexural strength=31,700 psi, flexural modulus=1,200 Kpsi and notched Izod impact=1.2 ft lb/in-notch.

EXAMPLE 39

A hexamethylene terephthalamide-isophthalamide-1,4-cyclohexane dicarboxamide (60/20/20 mole ratio) copolyamide was prepared substantially according to the procedures of U.S. Pat. No. 4,831,108. The polyamide had an inherent viscosity of 1.05. The copolyamide was combined with polypropylene and glass fiber to provide a blend comprising 20 pbw Polypropylene I, 75 pbw of the polyphthalamide and 5 pbw of CarboxyPP B filled with 31 wt % Glass Fiber S, and then injection molded to provide test specimens, substantially according to Example 10. Tested as before, the values obtained for the mechanical properties included HDT=537° F., ultimate tensile strength=23,100 psi, flexural strength=32,300 psi, flexural modulus=1,200 Kpsi and notched Izod impact=2.0 ft lb/in-notch.

EXAMPLE 40

A hexamethylene terephthalamide-isophthalamide-1,10-docenane dicarboxamide (60/15/25 mole ratio) copolyamide was prepared substantially according to the procedures of U.S. Pat. No. 4,831,108. The polyamide had an inherent viscosity of 0.85. The copolyamide was combined with polypropylene and glass fiber to provide a blend comprising 20 pbw Polypropylene I, 75 pbw of the polyphthalamide and 5 pbw of CarboxyPP B filled with 31 wt % Glass Fiber S, and then injection molded to provide test specimens, substantially according to Example 10. Tested as before, the values obtained for the mechanical properties included HDT=461° F., ultimate tensile strength=28,500 psi, flexural strength=39,400 psi, flexural modulus=1,400 Kpsi and notched Izod impact=2.8 ft lb/in-notch.

Glass-filled composites having flexural moduli greater than 1,000 Kpsi were obtained when similar blends of polypropylene with copolyamides comprising polycaprolactam moieties were prepared and tested, as well as from similar blends with copolyamides comprising 2,6-naphthalene dicarboxamides.

The invention will thus be seen to be a blend comprising a crystalline polypropylene, a polyphthalamide, and a carboxylated polypropylene, and composites and filled compositions comprising the blend and a reinforcing filler or fiber. More particularly, the the blend according to the invention will comprise 100 parts by weight (pbw) polypropylene, up to about 200 pbw, preferably from about 5 to about 100 pbw polyphthalamide and from 2 to about 20 pbw, per 100 parts combined weight of polypropylene and polyphthalamide, of carboxyl-modified polyolefin additive, preferably carboxyl-modified polypropylene additive. The polyphthalamide may be further described as a copolyamide comprising terephthalamides of acyclic or cycloalophatic $C_2$-$C_{12}$ aliphatic diamines with at least one additional diamide selected from aromatic diamides of aliphatic diamines and $C_4$-$C_{12}$ acyclic and cycloaliphatic dicarboxylic amides of aliphatic diamines, and more preferably will be a crystalline or crystallizable polyphthalamide comprising from about 50 to about 90 mole % hexamethylene terephthalamide, from about 50 to about 10 mole % hexamethylene adipamide, and from about 0 to about 30 mole % hexamethylene isophthalamide. When combined with up to about 80 wt %, preferably from about 5 to about 50 wt % structural fiber, either as continuous fiber or in the form of chopped or short fibers, flock, fiber pulp, fibrils or the like, the blends of this invention are useful in forming laminates and structural composites and fiber-filled molded and extruded articles.

The invention may also be characterized as a method for improving the flexural properties of polypropylene by the addition of from about 5 to about 100 pbw polyphthalamide to one hundred pbw polypropylene according to the invention. Both filled and neat resin blends are substantially improved in flexural properties over polypropylene alone, without a concomitant reduction in thermal processability that would have been expected for these more rigid blends, and particularly for fiber reinforced resin compositions.

The invention has been described and illustrated by way of specific embodiments set forth herein. Although the blends thus described are characterized as comprising a polypropylene and a carboxyl-modified polypropylene, those skilled in the art will recognized that alternative methods of preparation are available, such as by carrying out the polypropylene carboxylation using a very small quantity of carboxylic acid or anhydride or the like to provide a mixture comprising both carboxylated and unmodified polypropylene polymer chains, and such alternative methods and processes will be considered to lie within the scope of the invention. Still further modifications and variations will also be apparent to those skilled in the resin formulating and composite fabricating art, and such variations and modifications will be included within the scope of the invention as defined by the appended claims.

We claim:

1. A composition comprising 100 pbw crystalline polypropylene, from about 5 to about 100 pbw of polyphthalamide, from 2 to about 20 pbw of a carboxyl-modified polypropylene per hundred parts combined weight of polypropylene and polyphthalamide and a filler.

2. A composite composition comprising a blend of (a) 100 pbw crystalline polypropylene; (b) from about 5 to about 100 pbw of a copolyphthalamide containing from about 40 to about 90 mole % hexamethylene terephthalamide units and from 10 to about 60 mole % units selected from the group consisting of hexamethylene adipamide units and mixtures thereof with hexamethylene isophthalamide units, with the proviso that said polyphthalamide contain not more than 30 mole % hexamethylene isophthalamide units; and (c) from 2 to about 20 pbw, per 100 parts combined weight of polypropylene and polyphthalamide, of carboxyl-modified polypropylene; and from about 20 to about 50 wt % based on total composition of a filler.

3. The composite composition of claim 2 wherein said filler is structural fiber.

4. The blend of claim 2 wherein said filler is glass fiber.

5. The composition of claim 1 wherein said polyphthalamide comprises at least 35 mole % hexamethylene terephthalamide units.

6. The composition of claim 1 wherein said polyphthalamide comprises from about 40 to about 80 mole % hexamethylene terephthalamide units and from 10 to about 60 mole % hexamethylene isophthalamide units.

7. The composition of claim 1 wherein said polyphthalamide comprises from about 50 to about 80 mole % hexamethylene terephthalamide units and from 20 to about 50 mole % hexamethylene adipamide units.

8. The composition of claim 1 wherein said carboxyl-modified polypropylene is selected from the group consisting of maleated polypropylene and acrylic-grafted polypropylene.

9. The composition of claim 1 wherein said filler is glass fiber.

10. The composition of claim 9 comprising from about 20 to about 50 wt % of said glass fiber.

* * * * *

UNITED STATES PATENT AND TRADEMARK OFFICE
CERTIFICATE OF CORRECTION

PATENT NO.: 5,283,284

DATED: February 1, 1994

INVENTOR(S): Gary T. Brooks, Brian L. Joss, Charles L. Myers

It is certified that error appears in the above-identified patent and that said Letters Patent is hereby corrected as shown below:

| Col. | Line | |
|---|---|---|
| 8 | 35 | "a 32,051 tumble mixer," should read --a tumble mixer,-- |
| 10 | 17 | in "Table II" the column title reads "Example.:" should read --Example No.:-- |
| 10 | 25 | in "Table II" in the row underneath column "CarboxyPP C" beginning with "(%)" patent reads:"   4.2    11    25    0    0<br>              (2)   (5)   (10)       "<br>patent should read--<br>  4.2    11    25    0    0<br>  (2)   (5)   (10)   -- |
| 15 | 50 | in "Table X" in the line beginning "Polyphthalamide" patent reads:<br>"0   2645   71   100" patent should read<br>--0   26   45   71   100-- |

UNITED STATES PATENT AND TRADEMARK OFFICE
CERTIFICATE OF CORRECTION

PATENT NO.: 5,283,284

DATED: February 1, 1994

INVENTOR(S): Gary T. Brooks, Brian L. Joss, Charles L. Myers

It is certified that error appears in the above-identified patent and that said Letters Patent is hereby corrected as shown below:

| Col. | Line | |
|---|---|---|
| 15 | 53 | in "Table X" under the column "34" and in the line "parts" patent reads "6" patent should read --7-- |

Signed and Sealed this

Twenty-eighth Day of June, 1994

Attest:

BRUCE LEHMAN

Attesting Officer

Commissioner of Patents and Trademarks